(12) United States Patent
Mackinnon et al.

(10) Patent No.: US 12,399,158 B2
(45) Date of Patent: Aug. 26, 2025

(54) EQUAL DISPERSION SPLIT-FLOW MIXER

(71) Applicant: Waters Technologies Corporation, Milford, MA (US)

(72) Inventors: Peter Mackinnon, Providence, RI (US); Michael R. Jackson, Woonsocket, RI (US)

(73) Assignee: Waters Technologies Corporation, Milford, MA (US)

( * ) Notice: Subject to any disclaimer, the term of this patent is extended or adjusted under 35 U.S.C. 154(b) by 475 days.

(21) Appl. No.: 17/739,603

(22) Filed: May 9, 2022

(65) Prior Publication Data
US 2022/0373517 A1 Nov. 24, 2022

Related U.S. Application Data

(60) Provisional application No. 63/191,081, filed on May 20, 2021.

(51) Int. Cl.
*G01N 30/06* (2006.01)
*G01N 30/02* (2006.01)
(Continued)

(52) U.S. Cl.
CPC ............ *G01N 30/06* (2013.01); *G01N 30/16* (2013.01); *G01N 30/32* (2013.01); *G01N 2030/027* (2013.01); *G01N 2030/326* (2013.01)

(58) Field of Classification Search
CPC ....... G01N 2030/027; G01N 2030/326; G01N 30/06; G01N 30/16; G01N 30/32; G01N 30/34
See application file for complete search history.

(56) References Cited

U.S. PATENT DOCUMENTS

| 3,595,531 A | 7/1971 | Williams et al. |
| 3,830,369 A | 8/1974 | Pfadenhauer |

(Continued)

FOREIGN PATENT DOCUMENTS

| CN | 203061073 U | 7/2013 |
| CN | 203385703 U | 1/2014 |

(Continued)

OTHER PUBLICATIONS

Non-Final Office Action in U.S. Appl. No. 17/358,360 mailed on Sep. 15, 2022.

(Continued)

*Primary Examiner* — Kristina M Deherrera
*Assistant Examiner* — Gedeon M Kidanu
(74) *Attorney, Agent, or Firm* — Schmeiser, Olsen & Watts LLP; Victor J. Baranowski, Esq.

(57) ABSTRACT

Disclosed is a liquid chromatography system and mixer for use therein that includes a first split connected to an inlet, the first split branching the flow of fluid from the inlet into a first path and a second path; a second split connected to an outlet of the first path, the second split branching the first path into a third path and a fourth path; and a third split connected to an outlet of the second path, the third split branching the second path into a fifth path and a sixth path. The first path and the second path are offset by a first predetermined volume, the third path and the fourth path are offset by a second predetermined volume, and the fifth path and the sixth path are also offset by the second predetermined volume.

15 Claims, 7 Drawing Sheets

(51) Int. Cl.
*G01N 30/16* (2006.01)
*G01N 30/32* (2006.01)

(56) References Cited

U.S. PATENT DOCUMENTS

| | | |
|---|---|---|
| 4,311,586 A | 1/1982 | Baldwin et al. |
| 4,437,812 A | 3/1984 | Abu-Shumays et al. |
| 4,475,821 A | 10/1984 | Koch et al. |
| 4,496,245 A | 1/1985 | Conrad et al. |
| 4,506,987 A | 3/1985 | Daughton et al. |
| 4,534,659 A | 8/1985 | Pourdeville et al. |
| 4,842,730 A | 6/1989 | James et al. |
| 4,882,062 A | 11/1989 | Moeller et al. |
| 4,882,063 A | 11/1989 | Allington et al. |
| 4,954,253 A | 9/1990 | Alexandrov et al. |
| 5,275,723 A | 1/1994 | Greenley et al. |
| 5,423,661 A | 6/1995 | Gabeler et al. |
| 5,656,034 A | 8/1997 | Kochersperger et al. |
| 5,664,938 A | 9/1997 | Yang |
| 5,738,783 A | 4/1998 | Shirota et al. |
| 5,846,411 A | 12/1998 | Harter et al. |
| 5,887,977 A | 3/1999 | Morikawa |
| 5,904,424 A | 5/1999 | Schwesinger et al. |
| 5,918,976 A | 7/1999 | Hashimoto et al. |
| 6,048,496 A | 4/2000 | Zhou et al. |
| 6,116,869 A | 9/2000 | Couillard et al. |
| 6,170,981 B1 | 1/2001 | Regnier et al. |
| 6,190,034 B1 | 2/2001 | Nielsen et al. |
| 6,319,469 B1 | 11/2001 | Mian et al. |
| 6,616,327 B1 | 9/2003 | Kearney et al. |
| 6,629,775 B2 | 10/2003 | Choikhet et al. |
| 6,705,357 B2 | 3/2004 | Jeon et al. |
| 6,845,787 B2 | 1/2005 | Karp et al. |
| 6,851,846 B2 | 2/2005 | Fujii et al. |
| 6,883,559 B2 | 4/2005 | Jeon et al. |
| 6,887,384 B1 | 5/2005 | Frechet et al. |
| 6,916,113 B2 | 7/2005 | Van de Goor et al. |
| 6,919,046 B2 | 7/2005 | O'Connor et al. |
| 6,942,792 B2 | 9/2005 | Aso |
| 6,958,119 B2 | 10/2005 | Yin et al. |
| 6,981,522 B2 | 1/2006 | O'Connor et al. |
| 6,987,263 B2 | 1/2006 | Hobbs et al. |
| 6,991,729 B2 | 1/2006 | Ikeda et al. |
| 7,048,512 B2 | 5/2006 | Couillard et al. |
| 7,105,304 B1 | 9/2006 | Nikiforov et al. |
| 7,111,501 B2 | 9/2006 | Rocklin et al. |
| 7,112,277 B2 | 9/2006 | Bidlingmeyer et al. |
| 7,147,364 B2 | 12/2006 | Oohashi et al. |
| 7,178,386 B1 | 2/2007 | Gamble et al. |
| 7,204,139 B2 | 4/2007 | Takayama |
| 7,207,345 B2 | 4/2007 | Somerville |
| 7,241,423 B2 | 7/2007 | Golbig et al. |
| 7,278,329 B2 | 10/2007 | Weissgerber et al. |
| 7,314,070 B2 | 1/2008 | Jeon et al. |
| 7,390,121 B2 | 6/2008 | Jahn et al. |
| 7,744,762 B2 | 6/2010 | Lazar |
| 7,887,753 B2 | 2/2011 | Quake et al. |
| 7,976,779 B2 | 7/2011 | Tai et al. |
| 8,329,407 B2 | 12/2012 | Ismagilov et al. |
| 8,511,889 B2 | 8/2013 | Choikhet et al. |
| 8,517,597 B2 | 8/2013 | Shreve et al. |
| 8,622,609 B2 | 1/2014 | Shreve et al. |
| 8,696,193 B2 | 4/2014 | Herbstritt |
| 8,764,279 B2 | 7/2014 | Castro et al. |
| 8,894,274 B2 | 11/2014 | Shreve et al. |
| 8,979,358 B2 | 3/2015 | Wiechers |
| 9,126,164 B2 | 9/2015 | Shreve et al. |
| 9,128,071 B2* | 9/2015 | Tsukada ............ B01F 25/433 |
| 9,527,010 B2 | 12/2016 | Williams et al. |
| 9,528,968 B2 | 12/2016 | Murphy et al. |
| 9,557,317 B2 | 1/2017 | Ozbal |
| 9,566,537 B2 | 2/2017 | Geng |
| 9,636,646 B2 | 5/2017 | Neerincx et al. |
| 9,645,123 B2 | 5/2017 | Angelosanto et al. |
| 9,679,757 B2 | 6/2017 | Netto et al. |
| 9,766,217 B2 | 9/2017 | Kidal et al. |
| 9,791,107 B2 | 10/2017 | Witt et al. |
| 9,884,266 B2 | 2/2018 | Dauphas et al. |
| 9,945,820 B2 | 4/2018 | Albrecht, Jr. |
| 9,968,894 B2* | 5/2018 | Shreve ............... G01N 30/04 |
| 9,970,908 B2 | 5/2018 | Yotani et al. |
| 9,987,604 B2 | 6/2018 | Baaske et al. |
| 10,088,459 B2 | 10/2018 | Onoda et al. |
| 10,238,989 B2 | 3/2019 | Luongo et al. |
| 10,247,673 B2 | 4/2019 | Peterman et al. |
| 10,295,512 B2 | 5/2019 | Pohl et al. |
| 10,335,753 B2 | 7/2019 | De Corral et al. |
| 2002/0063060 A1 | 5/2002 | Gascoyne et al. |
| 2003/0077204 A1 | 4/2003 | Seki et al. |
| 2003/0123322 A1 | 7/2003 | Chung et al. |
| 2003/0156952 A1 | 8/2003 | Couillard et al. |
| 2004/0042340 A1 | 3/2004 | Aso |
| 2004/0092033 A1 | 5/2004 | Gustafson et al. |
| 2004/0096867 A1 | 5/2004 | Andersson et al. |
| 2004/0109793 A1 | 6/2004 | McNeely et al. |
| 2005/0118070 A1 | 6/2005 | Griss et al. |
| 2005/0252840 A1 | 11/2005 | Arnold et al. |
| 2006/0011548 A1 | 1/2006 | Yin et al. |
| 2006/0039829 A1 | 2/2006 | Suk et al. |
| 2006/0171864 A1 | 8/2006 | Caze et al. |
| 2006/0273012 A1 | 12/2006 | Dehmer |
| 2006/0280029 A1 | 12/2006 | Garstecki et al. |
| 2006/0285433 A1 | 12/2006 | Yang et al. |
| 2007/0148048 A1 | 6/2007 | Jousse |
| 2009/0142846 A1 | 6/2009 | Crenshaw et al. |
| 2009/0207687 A1 | 8/2009 | Kemperman et al. |
| 2009/0255601 A1 | 10/2009 | Baeuerle et al. |
| 2009/0268548 A1 | 10/2009 | Hartmann et al. |
| 2010/0159573 A1 | 6/2010 | Chung et al. |
| 2010/0189602 A1 | 7/2010 | Baeuerle et al. |
| 2011/0113866 A1 | 5/2011 | Finlay |
| 2011/0192217 A1 | 8/2011 | Choikhet et al. |
| 2012/0309648 A1 | 12/2012 | Tseng et al. |
| 2014/0061133 A1 | 3/2014 | Herman |
| 2014/0230528 A1 | 8/2014 | Wang et al. |
| 2014/0251448 A1 | 9/2014 | Witt et al. |
| 2014/0334251 A1 | 11/2014 | Shreve |
| 2014/0345372 A1 | 11/2014 | Gerhardt et al. |
| 2015/0059451 A1 | 3/2015 | Witt et al. |
| 2015/0132789 A1 | 5/2015 | Bornheimer et al. |
| 2016/0161454 A1 | 6/2016 | Jones et al. |
| 2016/0266078 A1 | 9/2016 | Onoda et al. |
| 2017/0173496 A1 | 6/2017 | Stone |
| 2017/0333898 A1 | 11/2017 | Saleh et al. |
| 2018/0056252 A1 | 3/2018 | Steele et al. |
| 2018/0088091 A1 | 3/2018 | Cormier et al. |
| 2019/0070571 A1* | 3/2019 | Jackson ............... B01F 33/30 |
| 2019/0070572 A1 | 3/2019 | MacKinnon et al. |
| 2019/0170706 A1 | 6/2019 | Gilar et al. |
| 2019/0265206 A1 | 8/2019 | Tarafder |
| 2019/0337211 A1 | 11/2019 | Kazmer |
| 2019/0383777 A1 | 12/2019 | Inoue |
| 2020/0023295 A1 | 1/2020 | Moeller et al. |
| 2020/0025723 A1 | 1/2020 | Gilar et al. |
| 2020/0276728 A1 | 9/2020 | Zeko et al. |
| 2021/0156829 A1 | 5/2021 | Raymond et al. |

FOREIGN PATENT DOCUMENTS

| | | |
|---|---|---|
| CN | 204116295 U | 1/2015 |
| CN | 106166453 A | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 109959745 A | 7/2019 |
| CN | 209333548 U | 9/2019 |
| CN | 209342666 U | 9/2019 |
| CN | 110394105 A | 11/2019 |
| CN | 111050895 A | 4/2020 |
| DE | 19840026 A1 | 3/1999 |
| DE | 19902697 A1 | 7/2000 |
| DE | 10307507 B4 | 9/2013 |
| DE | 102015100693 A1 | 7/2016 |

(56) References Cited

FOREIGN PATENT DOCUMENTS

| | | |
|---|---|---|
| DE | 102018104840 A1 | 4/2018 |
| DE | 102018104842 A1 | 4/2018 |
| EP | 1566215 A2 | 8/2005 |
| EP | 1788388 A1 | 5/2007 |
| FR | 2768189 A1 | 3/1999 |
| FR | 2836185 A1 | 8/2003 |
| FR | 3075068 A1 | 6/2019 |
| GB | 2332378 B | 12/2001 |
| GB | 2389629 B | 12/2005 |
| GB | 2524608 B | 4/2020 |
| JP | S5994064 A | 5/1984 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | 102170047 A | 6/1999 |
| JP | 2603770 Y2 | 3/2000 |
| JP | 3665680 B2 | 6/2005 |
| JP | 2006003203 A | 1/2006 |
| JP | 3780917 B2 | 5/2006 |
| JP | 2006122735 A | 5/2006 |
| JP | 3865119 B2 | 1/2007 |
| JP | 3959436 B2 | 8/2007 |
| JP | 4082309 B2 | 4/2008 |
| JP | 2009018311 A | 1/2009 |
| JP | 4348820 B2 | 10/2009 |
| JP | 4360206 B2 | 11/2009 |
| JP | 4683066 B2 | 5/2011 |
| JP | 2011107004 A | 6/2011 |
| JP | 5427603 B2 | 2/2014 |
| JP | 2014228499 A | 12/2014 |
| KR | 20020085903 A | 11/2002 |
| WO | 1997000125 A1 | 1/1997 |
| WO | 0022436 A1 | 4/2000 |
| WO | 0196024 A2 | 12/2001 |
| WO | 0221121 A1 | 3/2002 |
| WO | 2003015890 A1 | 2/2003 |
| WO | 2003024598 A1 | 3/2003 |
| WO | 2003098218 A1 | 11/2003 |
| WO | 2006017039 A1 | 2/2006 |
| WO | 2007021755 A2 | 2/2007 |
| WO | 2010015238 A1 | 2/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2011037530 A1 | 3/2011 |
| WO | 2013013717 A2 | 1/2013 |
| WO | 2013159816 A1 | 10/2013 |
| WO | 2013187916 A1 | 12/2013 |
| WO | 2014034259 A1 | 3/2014 |
| WO | 2016082520 A1 | 6/2016 |
| WO | 2018191787 A1 | 10/2018 |
| WO | 2018226907 A2 | 12/2018 |
| WO | 2019086671 A1 | 5/2019 |
| WO | 2019097490 A1 | 5/2019 |
| WO | 2019167011 A4 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

International Search Report and Written Opinion in PCT/US2022/030670 mailed on Sep. 23, 2022.
International Preliminary Report on Patentability in International Application No. PCT/US2021/039058, mailed on Jan. 19, 2023.
International Preliminary Report on Patentability in International Application No. PCT/US2021/039065, mailed on Jan. 19, 2023.
Final Office Action in U.S. Appl. No. 17/358,360 mailed on Feb. 28, 2023.
"Appropriate Mixer Volume for HPLC and UHPLC Applications," Oct. 11, 2014. https://hplctips.blogspot.com/2014/10/appropriate-mixer-vol. for-hplc-and.html.
"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
"HyperShear(™) HPLC and UHPLC Mixers" 2014, Analytical Scientific Instruments US, Inc.
"Reliable Solvent Mixing in UHPLC," Thermo Fisher Scientific, Inc., 2016.
"Varian Dual Chamber Dynamic Mixer Instruction Manual," Varian, Publication No. 0391467400, Issue 5, Feb. 2009.
Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Davis, et al. "A Sample, Reliable Rapid-Mixing Apparatus for Continuous-Flow Studies," Analytical Biochemistry 97 (1979) pp. 428-437.
Engelhardt, Heinz and Helmut Elgass, "Problems in the application of gradient elution to high-pressure liquid chromatography," Journal of Chromatography 112 (1975) pp. 415-423.
Gilbert, Scott "Lab-on-a-chip miniaturized on-line liquid chromatography," Crystal Vision Microsystems, CPAC Satellite Workshop, Rome, Italy, Mar. 20-22, 2006.
Huft, et al. "Microfluidic Integration of Paralell Solid-Phase Liquid Chromatography," Analytical Chemistry 85 (2013) 2999-3005.
Ianovska, et al. "Development of small-volume microfluidic chaotic mixers for future application in two-dimensional liquid chromatography," RSC Adv., 2017, 7, pp. 9090-9099.
Kaminski, et al. "Programming the Elution Gradient in High-Performance Chromatography By Varying The Volume Of the Mixing Chambers," Journal of Chromatography 176 (1979) pp. 171-180.
Kostanyan, Artak E. and Andrei A. Voshkin, "Support-free pulsedliquid-liquid chromatogrpahy," Journal of Chromatography A 1216 (2009) pp. 7761-7766.
Al Lawati, et al. "Combination of capillary micellar liquid chromatography with on-chip microfluidic chemiluminescence detection for direct analysis of buspirone in human plasma," Talanta 127 (2014) pp. 230-238.
Qian, Shizhi and Haim H. Bau, "Magneto-hydrodynamics based microfluidics," Mechanics Research Communications 36 (2009) 10-21.
Shi, et al., "Mixing enhancement via a serpentine micromixer for real-time activation of carboxyl," Chemical Engineering Journal, 2019. https://doi.org/10.1016/j.cej.2019.123642.
Steele, et al. "Reducing HPLC/UHPLC System Noise and Volume with High Performance Static Mixers, " Feb. 26, 2017, Mott Corporation.
Takeuchi, Toyohide and Daido Ishii, "Continuous Gradient Elution in Micro High- Performance Liquid Chromatography," Journal of Chromatography 253 (1982) pp. 41-47.
Wang, et al. "On-line two-dimensional countercurrent chromatography × high performance liquid chromatography system with a novel fragmentarydilution and turbulent mixing interface for preparation of coumarinsfrom Cnidium monnieri" Journal of Chromatography A, 1406 (2015) pp. 215-223.
International Search Report and Written Opinion in PCT/US2021/039058 mailed on Oct. 14, 2021.
International Search Report and Written Opinion in PCT/US2021/039065 mailed on Oct. 19, 2021.
International Search Report and Written Opinion in PCT/US2022/028299 mailed on Aug. 2, 2022.
Notice of Allowance in U.S. Appl. No. 17/358,391 mailed on Jan. 18, 2024.

(56) References Cited

OTHER PUBLICATIONS

International Preliminary Report on Patentability in PCT/US2022/030670 mailed on Jan. 4, 2024.
International Preliminary Report on Patentability in PCT/US2022/028299 mailed on Nov. 30, 2023.
Notice of Allowance in U.S. Appl. No. 17/358,360 mailed on Sep. 20, 2023.
Non-Final Office Action in U.S. Appl. No. 17/752,049 mailed on Mar. 6, 2025.

* cited by examiner

EQUAL DISPERSION SPLIT-FLOW MIXER

RELATED APPLICATIONS

This application is a non-provisional patent application claiming priority to U.S. Provisional Patent Application No. 63/191,081, filed May 20, 2021, entitled "Equal Dispersion Split-Flow Mixer," which is incorporated herein by reference.

FIELD OF THE INVENTION

The invention relates generally to chromatography. More particularly, the invention relates to an equal dispersion split-flow mixer for use in chromatography systems.

BACKGROUND

Chromatography is a set of techniques for separating a mixture into its constituents. Well-established separation technologies for fluid chromatography systems include HPLC (High Performance Liquid Chromatography), UPLC (Ultra Performance Liquid Chromatography) and SFC (Supercritical Fluid Chromatography). HPLC systems use high pressure, ranging traditionally between 1,000 psi (pounds per square inch) to approximately 6,000 psi, to generate the flow required for liquid chromatography (LC) in packed columns. Compared to HPLC, UPLC systems use columns with smaller particulate matter and higher pressures approaching 20,000 psi to deliver the mobile phase. SFC systems use highly compressible mobile phases, which typically employ carbon dioxide ($CO_2$) as a principal component.

In many of these fluid chromatography applications, it is desirable to mix fluids that are flowing continuously. For example, in liquid chromatography, a pump is used to deliver precise compositions of solvents to a chromatographic column for the purpose of separating liquid mixtures. The flow composition delivered by the pump can vary in time, and thereby emerge from the pump with compositional disturbances that occur at regular intervals as a result of the pump cycle or other phenomena. These regular intervals can occur at a constant or nearly constant frequency.

In some chromatography applications, additives such as trifluoroacetic (TFA) acid are used in the mobile phase solvents. It is desirable to blend or mix the stream as it flows for the purpose of smoothing out compositional discontinuities that can cause interference with sample detection. Various mixers exist which seek to achieve a desirable mixing of fluids in liquid chromatography systems. For example, large volume mixers exist that mix effectively, but do so with an increase in volume which must be flown through by a fluid or solvent, thereby drastically increasing testing time and diminishing throughput. In contrast, packed-bead LC mixers are inefficient relative to their delay volume, are difficult to manufacture, and are prone to contamination and clogging.

Thus, a mixer that eliminates or reduces the above-described deficiencies would be well received in the art.

SUMMARY

In one exemplary embodiment, a fluid chromatography system comprises: at least one solvent reservoir; a pump connected to the at least one solvent reservoir configured to pump a flow of fluid from the at least one solvent reservoir downstream; a mixer downstream from the pump, the mixer including: an inlet configured to receive the flow of fluid; an outlet configured to provide the flow of fluid downstream from the mixer after the flow of fluid is mixed in the mixer; a first split connected to the inlet, the first split branching the flow of fluid from the inlet into a first path and a second path; a second split connected to an outlet of the first path, the second split branching the first path into a third path and a fourth path; and a third split connected to an outlet of the second path, the third split branching the second path into a fifth path and a sixth path. The first path and the second path are offset by a first predetermined volume. The third path and the fourth path are offset by a second predetermined volume, and the fifth path and the sixth path are also offset by the second predetermined volume. The fluid chromatography system further comprises: a sample injector downstream from the mixer configured to inject a sample into the flow of fluid; a chromatography column downstream from the sample injector configured to perform separation of the sample; and a detector downstream from the chromatography column.

Additionally or alternatively, the mixer further comprises a flow restrictor system located downstream from the third, fourth, fifth and sixth paths, and wherein the flow restrictor system is balanced to provide an equal volume flow rate through each of the third, fourth, fifth and sixth paths.

Additionally or alternatively, the flow restrictor system includes a plurality of coiled restrictors.

Additionally or alternatively, the first predetermined volume is two times the second predetermined volume.

Additionally or alternatively, the mixer further comprises an amplitude controlling feature configured to reduce the amplitude of compositional disturbances.

Additionally or alternatively, the first predetermined volume and the second predetermined volume are each configured to target the same frequency of compositional disturbances in the flow of fluid.

Additionally or alternatively, the first predetermined volume and the second predetermined volume are each configured to target a different frequency of compositional disturbances in the flow of fluid.

Additionally or alternatively, the mixer further comprises a split system that includes the first split, the second split and the third split, and further comprising a recombination system downstream from the split system, wherein the recombination system includes an equal number of recombination points as splits in the split system.

Additionally or alternatively, the difference between the first predetermined volume is at or about 25 percent of the stroke volume of the pump and wherein the second predetermined volume is at or about 12.5 percent of the stroke volume of the pump.

In another exemplary embodiment, a mixer for use in a chromatography system comprises: an inlet configured to receive a flow of fluid; an outlet configured to provide the flow of fluid downstream from the mixer after the flow of fluid is mixed in the mixer; a first split connected to the inlet, the first split branching the flow of fluid from the inlet into a first path and a second path; a second split connected to an outlet of the first path, the second split branching the first path into a third path and a fourth path; and a third split connected to an outlet of the second path, the third split branching the second path into a fifth path and a sixth path, wherein the first path and the second path are offset by a first predetermined volume, and wherein the third path and the fourth path are offset by a second predetermined volume, and wherein the fifth path and the sixth path are also offset by the second predetermined volume.

Additionally or alternatively, the first predetermined volume and the second predetermined volume are each configured to target the same frequency of compositional disturbances in the flow of fluid.

Additionally or alternatively, the first predetermined volume and the second predetermined volume are each configured to target a different frequency of compositional disturbances in the flow of fluid.

Additionally or alternatively, the first predetermined volume is two times the second predetermined volume.

Additionally or alternatively, the mixer includes an amplitude controlling feature configured to reduce the amplitude of compositional disturbances.

Additionally or alternatively, the mixer includes a flow restrictor system located downstream from the third, fourth, fifth and sixth paths, and wherein the flow restrictor system is balanced to provide an equal volume flow rate through each of the third, fourth, fifth and sixth paths.

Additionally or alternatively, the flow restrictor system includes a plurality of coiled restrictors.

Additionally or alternatively, the mixer includes a split system that includes the first split, the second split and the third split, and further comprising a recombination system downstream from the split system, wherein the recombination system includes an equal number of recombination points as splits in the split system.

In another exemplary embodiment, a method of mixing fluid in a fluid chromatography system comprises: providing a fluid, by at least one fluidic pump, to a mixer; receiving the fluid by an inlet of the mixer; splitting the flow of fluid at a first split into at least a first path and a second path; splitting the flow of fluid in the first path into a third path and a fourth path; splitting the flow of fluid in the second path into a fifth path and a sixth path; offsetting the volume in the first path and the second path by a first predetermined volume; offsetting the volume in the third path and the fourth path by a second predetermined volume; and offsetting the volume in the fifth path and the sixth path by the second predetermined volume.

Additionally or alternatively, the method further includes targeting the same frequency of compositional disturbances in the flow of fluid with the first predetermined volume and the second predetermined volume.

Additionally or alternatively, the method further includes targeting a different frequency of compositional disturbances in the flow of fluid with the first predetermined volume and the second predetermined volume.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
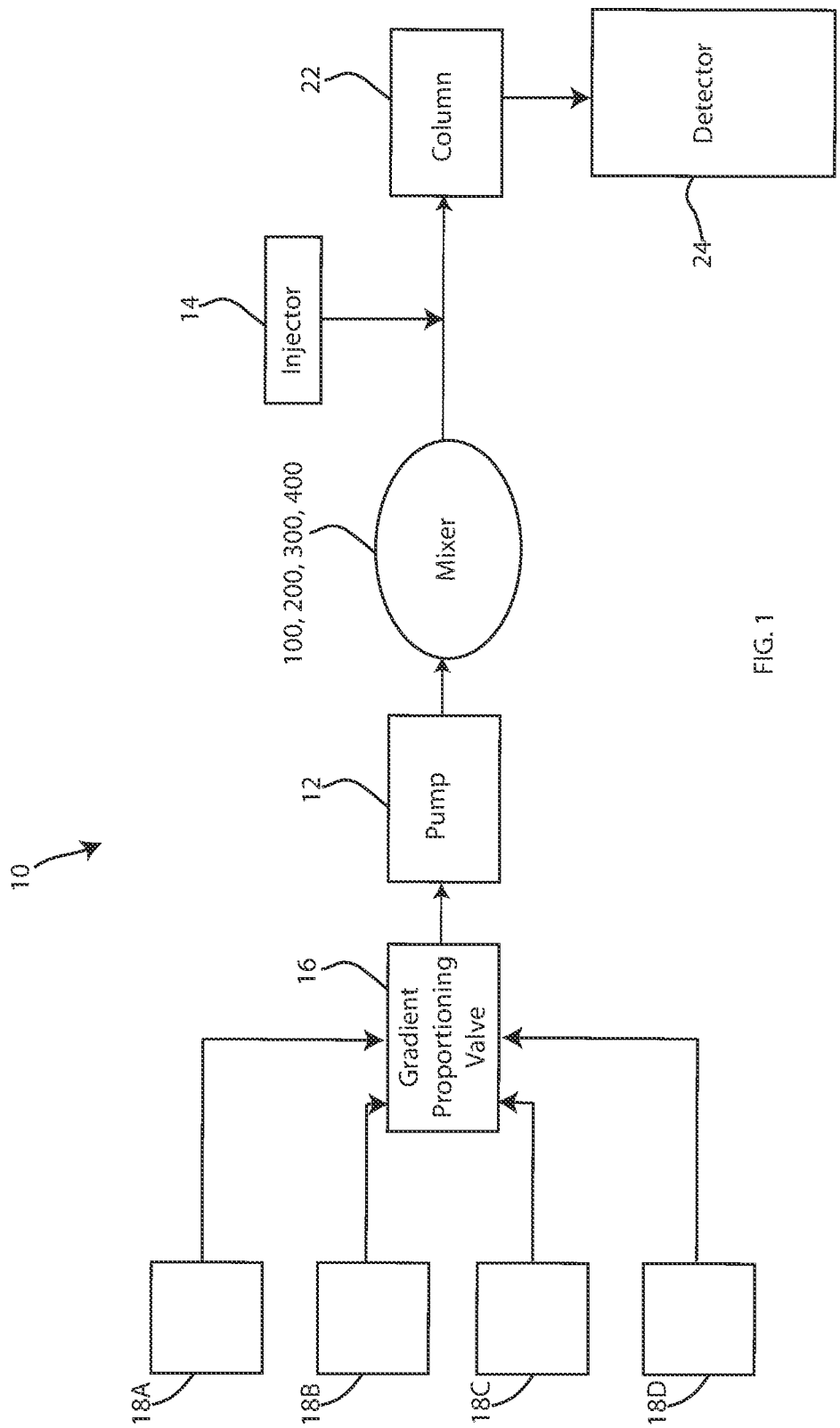
FIG. 1 depicts a block diagram of a liquid chromatography system, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

In brief overview, the invention relates to a mixer for use in chromatography systems that splits the flow of fluid in order to provide for mixing. Embodiments described herein include one or more of the following desirable traits of a liquid chromatography mixer: ability to operate passively; ease of manufacture, consistent performance, and efficient mixing of a continuous flow stream with respect to pressure drop and delay volume. Mixers described herein are configured to mix longitudinally, i.e. along the flow direction, and may provide for a smaller decay volume than an equivalent packed-bead mixer.

Moreover, mixers described herein may be configured for any setting where a continuous flow of fluid needs to be mixed. Particular embodiments described herein are geared toward fluid chromatography applications, and more particularly to liquid chromatography systems (i.e. HPLC and/or UPLC). However, embodiments may also be applicable to supercritical fluid systems (SFC). Any system in which fluid mixing is required may be applicable to the mixer embodiments described herein.

Mixers consistent with the present invention may further be configured to cancel and/or otherwise reduce fluidic oscillations in composition that depart from a desired composition by one or more frequencies. For example, in cases described herein, one or more pumps (e.g. a single quaternary pump or two binary pumps) located upstream from the mixer may be configured to pump fluid downstream to the mixer. However, prior to mixing by the mixer, the composition expelled by the pump is not sufficiently mixed. Depending on the pump, the composition downstream from the pump oscillate from a desired composition, referred to in the art as "compositional ripple." Such unwanted compositional variance may occur at regular periodic frequencies dependent on the upstream pump system being used, and may become known to a chromatography system designer such that the mixer may be particularly configured to cancel or reduce one or more the frequencies in composition ripple or variance in accordance with embodiments described herein below.

Mixers described herein may be configured to reduce or cancel this unwanted compositional ripple whether the pump is set to pump a constant amount of solvent, or alternatively set to deliver a gradient. In either situation, there is a desired composition at a given point in time. Any departure from that desired composition, in the form of a compositional oscillation at a given frequency, is unwanted and may be prevented by the mixers described herein.

Embodiments of the present invention further provide split-flow mixers in which a fluid flow that enters an inlet is split into two or more fluidic paths. One or both of those paths may include a volume offset region configured to delay fluid propagation through the second flow channel relative to the first flow channel. In combination, the paths may be offset by a first predetermined volume. In other words, one of the paths may comprise a volume that is offset (i.e. greater or less than) from another path by a predetermined volumetric amount. In multi-stage designs, the two or more paths may further include additional downstream splits to create additional stage(s). For each additional splitting stage, the two or more paths emerging directly from the split may be offset by a predetermined volumetric amount. The predetermined volumetric amounts within each stage may be the same, but the predetermined volumetric amounts may be different from stage to stage.

The various single or multi stage splits may make up a split system. Connected downstream from the split system may be a flow restrictor system. The flow restrictor system may be balanced in a manner such that the various paths that directly connect to the flow restrictor system include equal volume flow rates when the mixer is deployed. Similarly, downstream from the split system is a recombination system, which may include a number of recombination points that equals the number of upstream split points.

Depending on the particular predetermined volumes to offset the paths after a given split, each stage of the splits may be configured to reduce or cancel these unwanted oscillations in composition at a specific frequency. In combination, any given molecule of fluid introduced to the mixer may flow through one path at each post-split stage before recombining. Overall, the various stages may be configured to significantly cancel most or all of the unwanted compositional ripple or oscillation in the composition of fluid coming from the pump.

FIG. 1 shows an embodiment of an exemplary liquid chromatography system 10 for separating a sample into its constituents. The liquid chromatography system 10 can be an HPLC, UPLC, or the like. The liquid chromatography system 10 includes a solvent delivery system that includes a plurality of solvent reservoirs 18A, 18B, 18C, 18D. The solvent reservoirs are connected to a gradient proportioning valve 16 which provides the combined solvents to a quaternary pump 12. The quaternary pump 12 draw solvents through a fluidic conduit, which may be a fluidic conduit, line, tube or channel.

While not shown, other embodiments of the liquid chromatography system 10 contemplated may be a binary pump system having two binary pumps (i.e. using a binary solvent manager BSM system). Thus, the present invention may be included in a BSM system including two high pressure mixing pumps in which frequencies due to the pump cycle cause flow perturbations. In such instances, the frequencies of unwanted compositional fluctuations may be fixed in these BSM systems. Hereinafter, while the quaternary pump 12 is shown, it should be understood that the mixers described herein, and concepts described herein, are applicable to BSM systems as well as quaternary solvent manager (QSM) systems.

The quaternary pump 12 may have a single pair of pump heads and alter the composition via a switching valve upstream of the pump 12. The quaternary pump 12 may be configured to deliver up to four different solvents (as shown, solvents from reservoirs 18A, 18B, 18C, 18D) with the switching valve. Compositional ripple as described herein occurs because only one solvent is delivered at a time to the quaternary pump 12 by the gradient proportioning valve 16. The valve 16 alternates between the solvents rapidly to achieve the commanded composition. However, the solvents may not fully blend in the pump heads. Additionally, during a gradient where the set composition is changing over time, each pump stroke has a different composition. Thus, the quaternary pump 12 in this case creates an undesirable staircase-shaped delivered composition curve that needs additional mixing for proper detection downstream.

Figure 2:
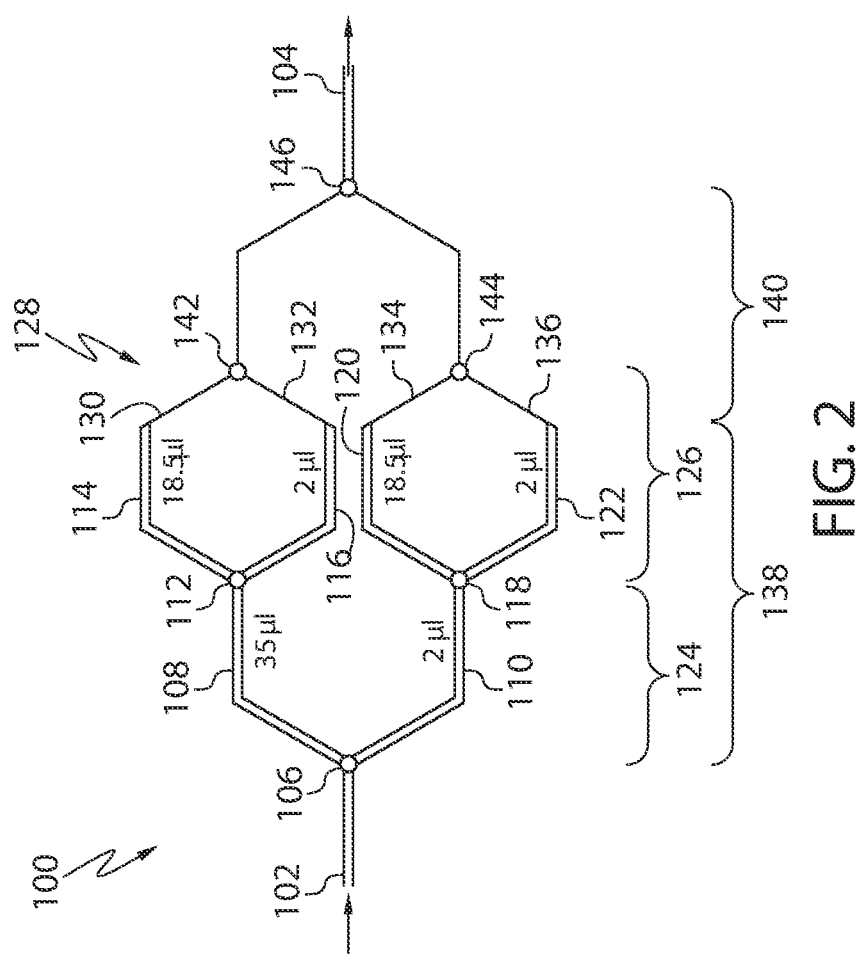
FIG. 2 depicts a schematic view of a mixer for use in the liquid chromatography system of FIG. 1, in accordance with one embodiment.
Figure 3:
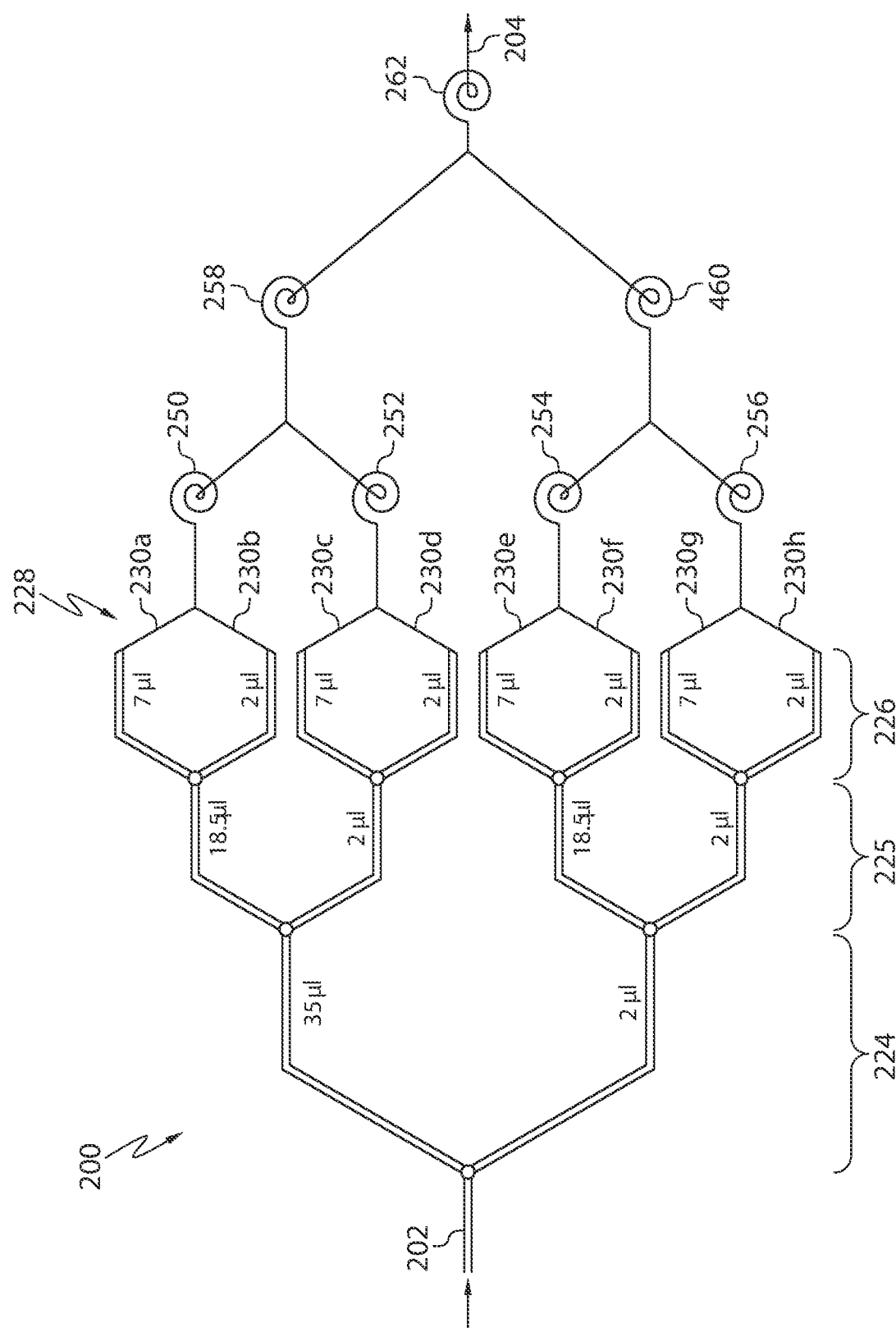
FIG. 3 depicts a schematic view of another mixer for use in the liquid chromatography system of FIG. 1, in accordance with one embodiment.

Downstream from the quaternary pump 12 may be a mixer, which may be exemplified by any one or a combination of the mixers 100, 200, 300, 400 described hereinbelow. The mixer 100, 200, 300, 400 may be configured to passively mix the pumped fluid in accordance to the embodiments described herein. While the specific features of mixer 100, 200, 300, 400 is shown in FIGS. 2 and 3 and described herein below, the liquid chromatography system 10 can include any mixer consistent with the mixer embodiments described herein, such as the mixer 200 described in FIGS. 4 and 5, instead of the mixer 100, 200, 300, 400.

Downstream from the mixer 100, 200, 300, 400 is shown an injector 14. The injector 14 may be included as a feature of a sample manager or other assembly or sub-system configured to inject a sample into the flow of fluid coming from the mixer 100, 200, 300, 400. The injector 14 may include an injector valve with a sample loop. The sample manager may control the injection of the sample and may operate in one of two states: a load state and an injection state. In the load state, the position of the injector valve of the injector 14 is such that the solvent manager loads the sample into the sample loop; in the injection state, the position of the injector valve of the injector 14 changes so that solvent manager introduces the sample in the sample loop into the continuously flowing mobile phase arriving from the mixer 100, 200, 300, 400.

With the injector valve of the injector 14 in the injection state, the mobile phase carries the sample into a column 22. The chromatography column 22 is in fluidic communication with the injector 14 through, for example, a fluidic tube. The chromatography column 22 may be configured to perform sample separation according to techniques known in the art. Another fluidic tube couples the output port of the column 22 to a detector 24, for example, a mass spectrometer, a UV detector, or any other detector. Through the fluidic tube, the detector 24 may be configured to receive the separated components of the sample from the column 22 and produce an output from which the identity and quantity of analytes of the sample may be determined. Noise in the absorbance of the separated components over time may be reduced by the mixers described herein.

The liquid chromatography system 10 is shown for exemplary purposes, and the various features shown may be modified, changed or replaced with any features of any known liquid chromatography system without departing from the scope of the invention. For Furthermore, while the invention is shown by way of example with a liquid chromatography system, mixers described herein may be deployed with any fluidic system, including supercritical fluid chromatography (SFC) systems or even non-chromatography applications.

In one exemplary embodiment of the liquid chromatography system 10 shown above, two solvents are delivered from each of solvent reservoirs 18A and 18B. The other solvent reservoirs 18C and 18D may not be used in this embodiment. The solvent from reservoir 18A may be water with 0.1% trifluoroacetic acid (TFA). The solvent from reservoir 18B may be acetonitrile (ACN) with 0.1% TFA. In such an embodiment, more TFA sticks to the column when solvent from reservoir 18A passes through, less sticks when solvent from reservoir 18B passes through. In this manner, oscillations in the composition will cause the amount of TFA leaving the column to oscillate. The TFA in the compositions absorbs light at the wavelength the detector 24 is observing. Thus, the mixer 100, 200, 300, 400 is configured to prevent noise waves seen in the baseline of the chromatogram that would otherwise be present if unwanted oscillations in the composition, or "compositional ripple" was present. Such oscillations would interfere with the quantification of the size of sample peaks and thereby are desirable to prevent by the mixer 100, 200, 300, 400 in accordance with embodiments described herein.

FIG. 2 depicts a schematic view of a mixer 100 for use in the liquid chromatography system 10 of FIG. 1, in accordance with one embodiment. The mixer 100 includes an inlet 102 configured to receive a flow of fluid, such as a solvent composition coming from the upstream quaternary pump 12 of FIG. 1. The mixer 100 further includes an outlet 104 configured to provide the flow of fluid downstream from the mixer 100 to the injection location, column 14 and detector 24 shown in FIG. 1, after the flow of fluid is mixed in the mixer 100. The mixer 100 includes a first split 106 connected to the inlet 102. The first split 106 may be configured to branch the flow of fluid from the inlet 102 into a first path 108 and a second path 110. A second split 112 is shown connected to an outlet of the first path 108. The second split 112 may be configured to branch the first path 108 into a third path 114 and a fourth path 116. Likewise, a third split 118 is shown connected to an outlet of the second path 110. The third split 118 may be configured to branch the second path 110 into a fifth path 120 and a sixth path 122.

The first path 108 and the second path 110 are shown offset by a first predetermined volume. In the embodiment shown, the first path 108 includes a fluidic volume of 35 microliters (µl) and the second path 110 includes a fluidic volume of 2 µl. Thus, the first predetermined volume offset between the first path 108 and the second path 110 is 33 µl.

Similarly, the third path 114 and the fourth path 116 are shown offset by a second predetermined volume. In the embodiment shown, the third path 114 includes a fluidic volume of 18.5 microliters (µl) and the fourth path 116 includes a fluidic volume of 2 µl. Thus, the second predetermined volume offset between the third path 114 and the fourth path 116 is 16.5 µl.

Finally, the fifth path 120 and the sixth path 122 are shown offset by the same second predetermined volume. In the embodiment shown, the fifth path 120 includes a fluidic volume of 18.5 microliters (µl) and the sixth path 122 includes a fluidic volume of 2 µl. Thus, again the volume offset between the third path 114 and the fourth path 116 is 16.5 µl, the same as the volume offset between the third path 114 and the fourth path 116.

As shown, the mixer 100 includes two stages of splits, a first stage 124 and a second stage 126. While the first predetermined volume offset of 33 µl and the second predetermined volume offset of 16.5 µl are also exemplary, it is contemplated that the volume offset at each individual stage of splits is equal. Thus, in the even that the mixer 100 included additional split stages (i.e. a third stage having eight additional paths and/or a fourth stage having sixteen additional paths), it is contemplated that each path pairing would share the same volume offset as the other path pairings in the same stage.

Moreover, the present invention further contemplates two paths extending from each of the splits 106, 112, 118. These split pairings may be particularly beneficial in targeting regular frequencies in compositional disturbances in fluid received by the mixer. However, in other embodiments, each split may break into any number of paths. However, whatever the embodiment, the number of paths extending from a split point may be the same within a given stage. Moreover, the offsets between the two or more paths coming from a split on a given stage may be the same as the offsets between the two or more paths coming from each of the other splits on the same stage.

The respective volumes of the various paths 108, 110, 112, 114, 116 are exemplary and any volumes are contemplated. However, the volumes shown in the embodiment of FIG. 2 may be particularly useful in targeting specific frequencies of compositional disturbances. For example, at the first stage, the volume offset of 33 µl at the first stage (i.e. the first predetermined volume offset) may target a volume frequency of 132 µl, four times the offset amount. At the second stage, the volume offset of 16.5 µl may also be targeting the same volume frequency of 132 µl. In an embodiment of a liquid chromatography system where the stroke volume of the pump 12 is 132 µl, the volume offset of the mixer may be configured to target the stroke volume. In this embodiment, the difference between the first predetermined volume is at or about 25 percent of the stroke volume of the pump and the second predetermined volume is at or about 12.5 percent of the stroke volume of the pump. In the embodiment shown, the first predetermined volume of the first stage is two times the second predetermined volume at the second stage—this structure (the upstream stage being two times the volume offset as the downstream stage) is configured to target the same frequency of compositional disturbances in the flow of solvent. However, in other embodiments, the first and second predetermined volumes may be different and may be configured to target different frequencies of compositional disturbances in the flow of solvent.

Downstream from the greater volume portions of the third, fourth, fifth and sixth paths 114, 116, 120, 122 is a flow restrictor system 128. The flow restrictor system 128 may be configured to restrict flow in a balanced manner in order to provide for ensuring an equal volume flow rate through each of the third, fourth, fifth and sixth paths 114, 116, 120, 122 when the mixer is in use and receiving a flow at the inlet 102. The flow restrictor system 128 may include four separate flow restrictors 130, 132, 134, 136 located prior to recombining each of the third, fourth, fifth and sixth paths 114, 116, 120, 122. However, the flow restrictor system 128 may further include flow restrictor sections located downstream from when the third, fourth, fifth and sixth paths 114, 116, 120, 122 begin to converge prior to the outlet 104. Whatever the configuration, the flow restrictor system 128 may dominate the fluidic resistance of each of the flow paths 114, 116, 120, 122, thereby restricting volume flow rate in a manner that ensures balanced flow through each of the various flow paths 114, 116, 120, 122.

The mixer 100 shown can be characterized as including a split system 138 and a recombination system 140. The split system includes the first split 106, the second split 112, the third split 114. Likewise, the recombination system includes a first and second recombination point 142, 144, and a third recombination point 146 located downstream from the first and second recombination points 142, 144. Thus, the recombination system 140 includes an equal number of recombination points 142, 144, 146 as splits 106, 112, 114.

FIG. 3 depicts a schematic view of another mixer 200 for use in the liquid chromatography system 10 of FIG. 1, in accordance with one embodiment. Like the mixer 100, the mixer 200 includes an inlet 202 configured to receive a flow of fluid, such as a solvent composition coming from the upstream quaternary pump 12 of FIG. 1. The mixer 200 further includes an outlet 104 configured to provide the flow of fluid downstream from the mixer 200 to the injection location, column 14 and detector 24 shown in FIG. 1, after the flow of fluid is mixed in the mixer 200.

Unlike the mixer 100, the mixer 100 includes three successive stages of splits 224, 225, 226. At the first stage 224, the inlet 202 is split into one pair of paths (two total paths). At the second stage 225, the two paths are split into four paths (two pairs of paths). Finally, at the third stage 226, the four paths are split into eight paths (four pairs of paths). The first two stages include offset volumes that are the same as the first predetermined volume offset of 33 µl and the second predetermined volume offset of 16.5 µl found in the mixer 100. Again, each of these volume offsets (33 µl at the first stage and 16.5 µl at the second stage) may be configured to target the frequency embodied by the stroke volume of the pump 12. However, unlike the mixer 100, the mixer 200 includes a third stage of four pairs of paths. Each of these pairs of paths includes a third predetermined volume offset of 5 µl. This 5 µl volume offset amount, being that it is the offset of the third stage, is configured to target a frequency of 80 µl. Thus, in this embodiment, the first and second stages may be configured to target one frequency of compositional disturbances in the flow of fluid through the mixer, while the third stage may be configured to target a different frequency of compositional disturbances in the flow of fluid through the mixer.

Additionally, the mixer 200 includes a flow restrictor system 228 that includes eight balanced flow restrictors 230a, 230b, 230c, 230d, 230e, 230f, 230g, 230h that extend from each of the eight individual paths from the third stage. After the eight paths converge into four outlet paths, the four outlet paths each include a separate coiled restrictor 250, 252, 254, 256. The coiled restrictors 250, 252, 254, 256 may be configured to help further mix and disperse the fluid. After the four separate outlet paths converge into two outlet paths, the two outlet paths each include a separate coiled restrictor 258, 260. Finally, after the two outlet paths converge to the outlet 104, a final coiled restrictor 262 is located in line but immediately upstream from the outlet 204.

Figure 4:
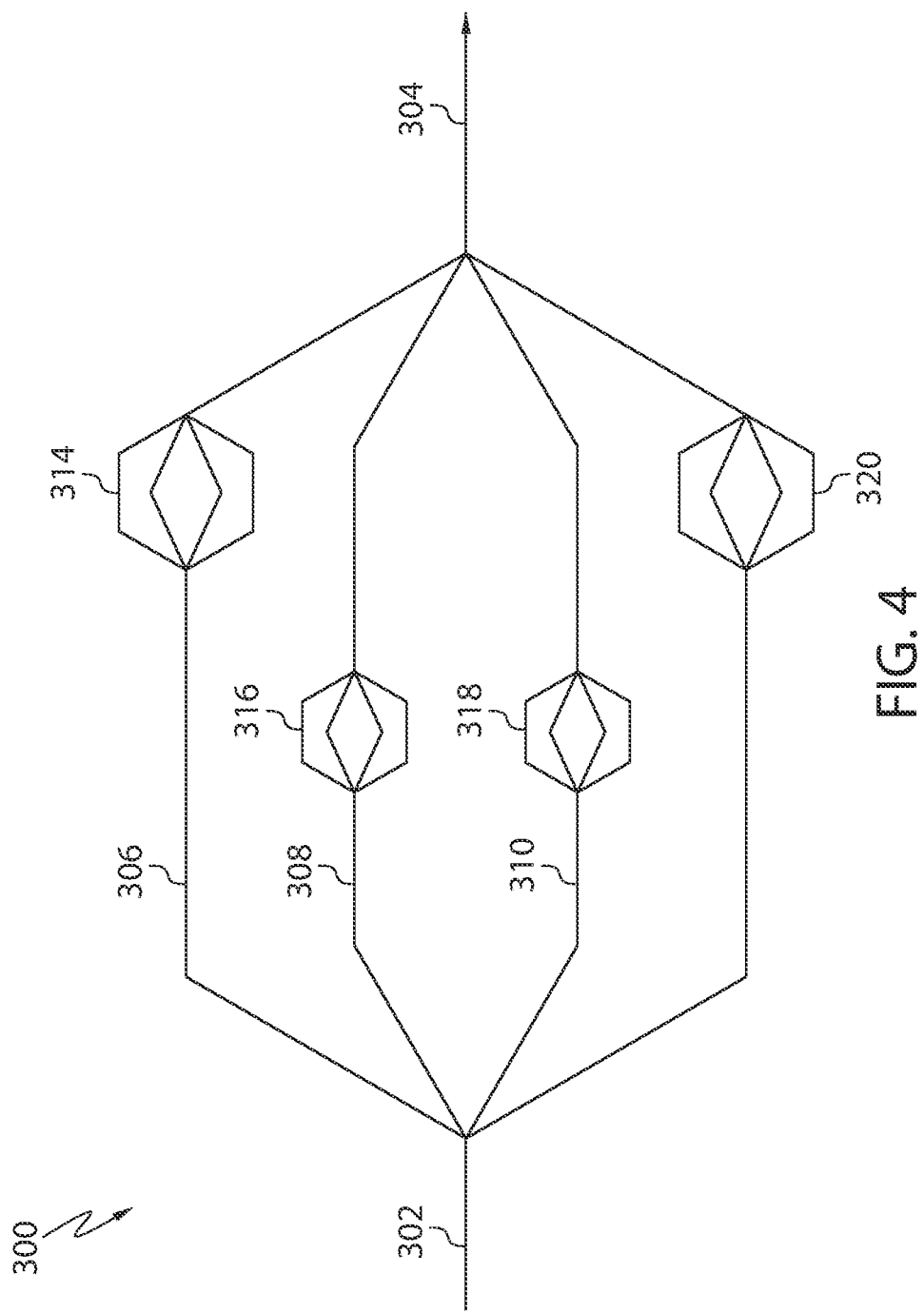
FIG. 4 depicts a schematic view of another mixer for use in the liquid chromatography system of FIG. 1, in accordance with one embodiment.

FIG. 4 depicts a schematic view of another mixer 300 for use in the liquid chromatography system 10 of FIG. 1, in accordance with one embodiment. Like the mixers 100, 200, the mixer 300 includes an inlet 302 configured to receive a flow of fluid, such as a solvent composition coming from the upstream quaternary pump 12 of FIG. 1. The mixer 300 further includes an outlet 304 configured to provide the flow of fluid downstream from the mixer 300 to the injection location, column 14 and detector 24 shown in FIG. 1, after the flow of fluid is mixed in the mixer 300.

Unlike the mixers 100, 200, the mixer 300 splits the flow of fluid into four separate paths. The various paths can have any predetermined volume within greater volume regions 306, 308, 310, 312 in order to target frequencies of compositional disturbances in the flow of fluid through the mixer. In one embodiment, two of the greater volume regions 306, 312 include a first volume offset configured to target a first frequency, while the two middle greater volume regions 308, 310 may include volumes to target a second frequency that is different than the first frequency.

Whatever the embodiment, each of the four flow paths of the mixer 300 includes an amplitude controlling feature 314, 316, 318, 320 located downstream from the respective greater volume regions 306, 308, 310, 312. The amplitude controlling feature is shown as a mini split mixer that includes four additional flow paths. The mini split mixer may also be configured to target a specific frequency of compositional disturbances in the flow of fluid entering the mixer 300. In other embodiments, the amplitude controlling features may be coiled restrictors, as shown in FIG. 3. Whatever the embodiment, the amplitude controlling features 314, 316, 318, 320 may be configured to reduce the amplitude of the target frequency in a controlled manner so that the resulting amplitudes at the downstream recombination point are equivalent. Moreover, the amplitude controlling features 314, 316, 318, 320 may be configured to disperse fluid in an equivalent manner so that the paths through the mixer include an equivalent or nearly equivalent dispersion.

Both FIGS. 3 and 4 display applying amplitude controlling features 250, 252, 524, 256, 258, 260, 262, 314, 316, 318, 320 in order to equivalently disperse fluid through each path. The amplitude controlling features, such as those shown in FIGS. 3 and 4, can be applied to any embodiment described herein. For example, amplitude controlling features may be located downstream from the volume offset paths, but upstream from a flow restrictor system. Alternatively, amplitude controlling features may be located downstream from volume offset paths and also downstream from a flow restrictor system. Finally, an amplitude controlling feature may be located prior to a greater volume path.

Figure 5A:
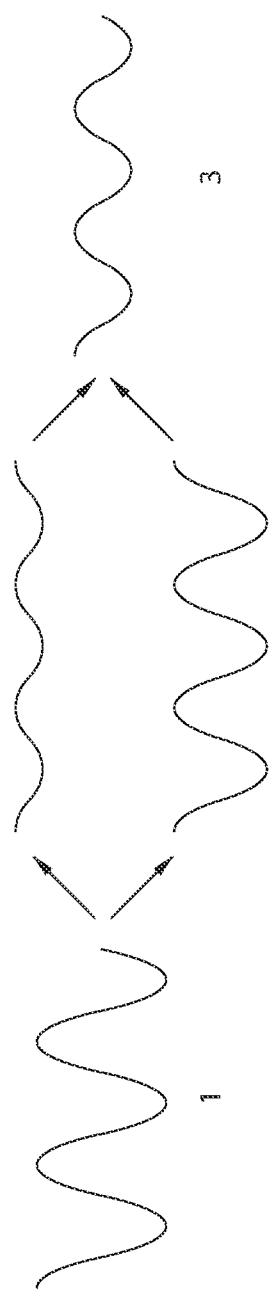
FIG. 5A depicts a graphical representation of a compositional disturbance of a flow of fluid as a function of time through a volume offset split flow mixer prior to a volume offset split, after each volume offset split before recombination, and after recombination.
Figure 5B:
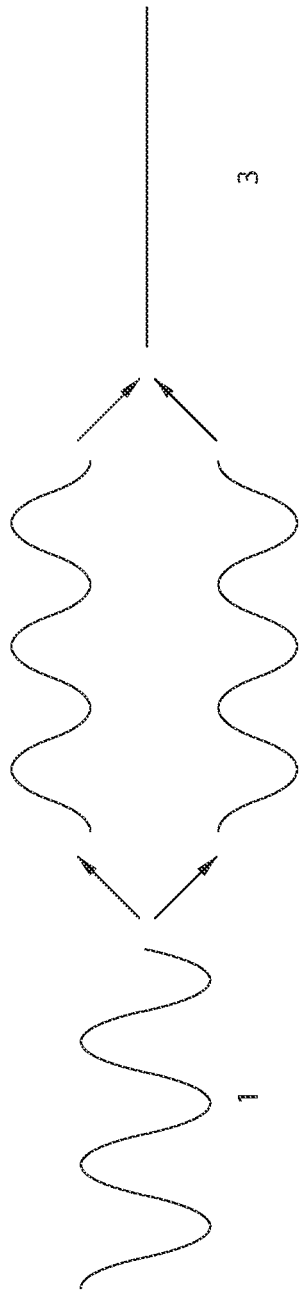
FIG. 5B depicts a graphical representation of a compositional disturbance of a flow of fluid as a function of time through a volume offset split flow mixer deploying an amplitude controlling feature prior to a volume offset split, after each volume offset split before recombination, and after recombination.

FIGS. 5A and 5B display the problem of how an even volumetric split with more dispersion on one side of the volume split might cause a compositional disturbance that is not fully canceled despite going through a frequency targeting volume offset split mixer, such as the embodiments described herein. In particular, FIG. 5A depicts a graphical representation of a compositional disturbance of a flow of fluid as a function of time through a volume offset split flow mixer prior to a volume offset split (stage 1), after each volume offset split before recombination (stage 2), and after recombination (stage 3). The fluid through the mixer inlet is shown at stage 1 to include a composition that is changing at a regular frequency due to a compositional disturbance. At stage 2, the fluid is split into two paths and the phase of the top path is altered relative to the bottom path due to a volume offset. However, the bottom path and the top path include different dispersions resulting in different amplitudes. Thus, after the recombination point at stage 3, the compositional disturbance remains, albeit with a smaller amplitude. Thus, the disturbance has been reduced but not eliminated.

FIG. 5B depicts a graphical representation of a compositional disturbance of a flow of fluid as a function of time through a volume offset split flow mixer deploying an amplitude controlling feature prior to a volume offset split (stage 1), after each volume offset split before recombination (stage 2), and after recombination (stage 3). Like the example of FIG. 5A, the fluid through the mixer inlet in FIG. 5B is shown at stage 1 to include a composition that is changing at a regular frequency due to a compositional disturbance. At stage 2, the fluid is split into two paths and the phase of the top path is altered relative to the bottom path due to a volume offset. Unlike the example in FIG. 5A, the bottom path and the top path include equal dispersions resulting in the same amplitudes. Equivalent dispersions and amplitudes can be created via utilization of an amplitude controlling feature, such as one of the amplitude controlling features 250, 252, 524, 256, 258, 260, 262, 314, 316, 318, 320. Thus, after the recombination point at stage 3, the compositional disturbance is eliminated.

Figure 6:
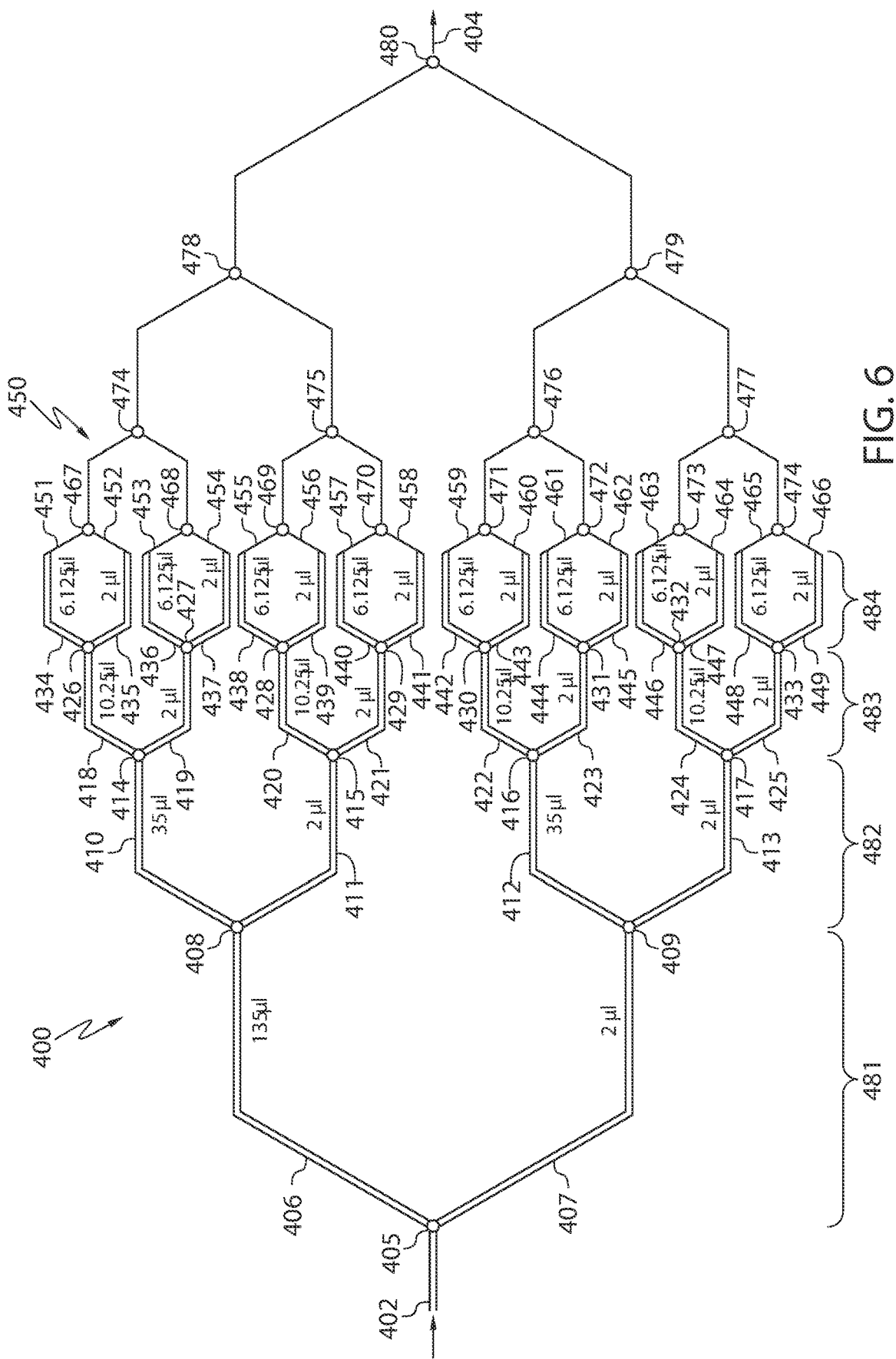
FIG. 6 depicts a schematic view of another mixer for use in the liquid chromatography system of FIG. 1, in accordance with one embodiment.
Figure 7:
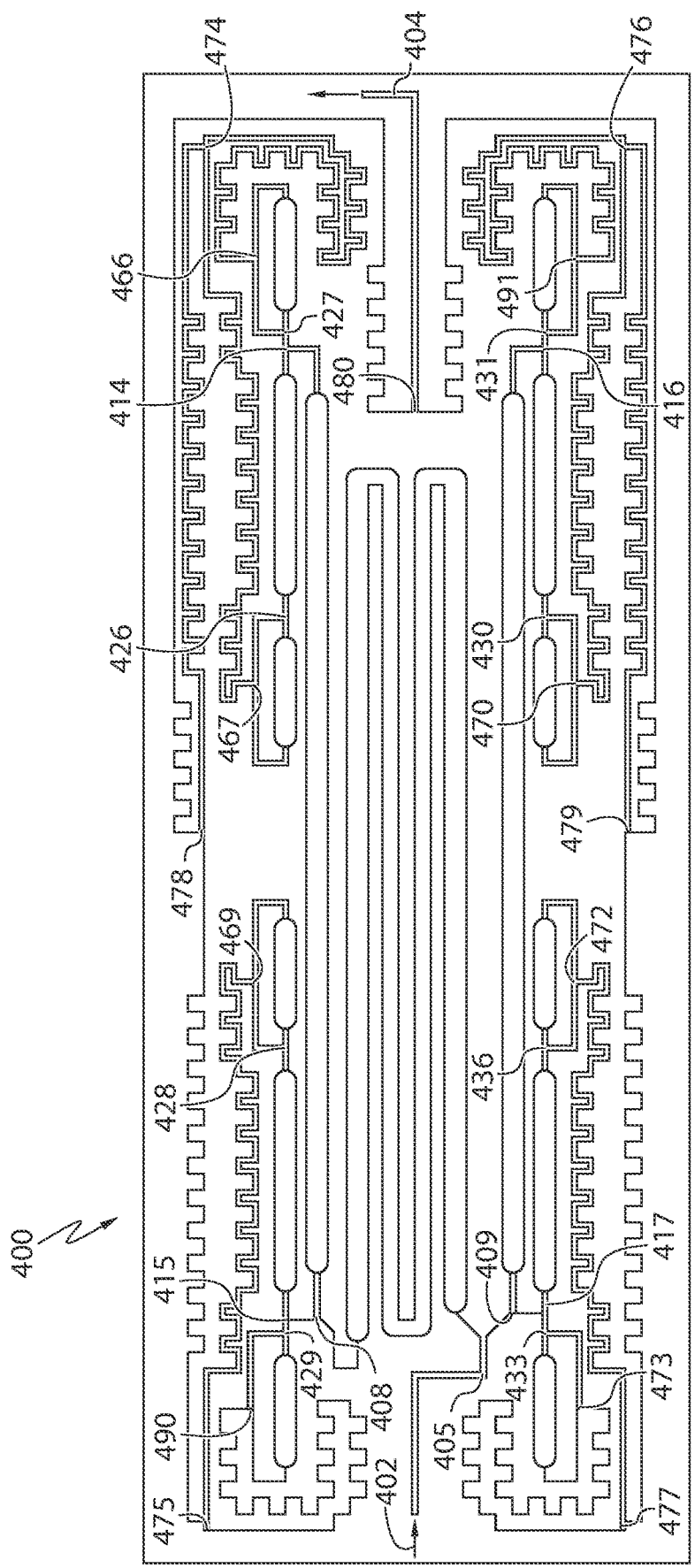
FIG. 7 depicts a top view of the mixer of FIG. 6 with channels created in a substrate or surface, in accordance with one embodiment.

FIG. 6 depicts a schematic view of another mixer 400 for use in the liquid chromatography system 10 of FIG. 1, in accordance with one embodiment. FIG. 7 depicts a top view of the mixer 400 of FIG. 6 with channels created in a substrate or surface, in accordance with one embodiment. While FIG. 6 labels each individual component, FIG. 7 labels only the split and recombination points.

As shown, the mixer 400 includes an inlet 402 configured to receive a flow of fluid, such as a solvent composition coming from the upstream quaternary pump 12 of FIG. 1. The mixer 400 further includes an outlet 404 configured to provide the flow of fluid downstream from the mixer 400 to the injection location, column 14 and detector 24 shown in FIG. 1, after the flow of fluid is mixed in the mixer 400. The mixer 400 includes a first split 405 connected to the inlet 402. The first split 405 may be configured to branch the flow of fluid from the inlet 402 into a first path 406 and a second path 407. A second split 408 is shown connected to an outlet of the first path 406. The second split 408 may be configured to branch the first path 406 into two additional paths 410, 411. Likewise, a third split 409 is shown connected to an outlet of the second path 407. The third split 409 may be configured to branch the second path 407 into two additional paths 412, 413.

The first path 406 and the second path 407 are shown offset by a first predetermined volume. In the embodiment shown, the first path 406 includes a fluidic volume of 135 microliters (µl) and the second path 407 includes a fluidic volume of 2 µl. Thus, the first predetermined volume offset between the first path 406 and the second path 407 is 133 µl. Thus, a first stage 481 of the mixer 400 includes this predetermined volume offset of 133 µl. Similarly, a second stage 482 of the mixer 400 includes a volume offset of 33 µl defined by 35 µl on one path and 33 µl on the other.

Like the mixer 300, the mixer 400 includes a third stage comprising four split points 414, 415, 416, 417 and eight paths (four pairs) 418, 419, 420, 421, 422, 423, 424, 425. The third stage includes a volume offset of 8.25 µl defined by 10.25 µl volume on one path and 2 µl volume on the other. Unlike the mixer 300, the mixer 400 includes a fourth stage comprising eight split points 426, 427, 428, 429, 430, 431, 432, 433 and sixteen paths (eight pairs) 434, 435, 436, 437, 438, 439, 440, 441, 442, 443, 444, 445, 446, 447, 448, 449. The fourth stage includes a volume offset of 4.125 µl defined by 6.125 µl volume on one path and 2 µl volume on the other.

Downstream from the fourth stage includes a flow restrictor system 450 defined by sixteen flow restrictors 451, 452, 453, 454, 455, 456, 457, 458, 459, 460, 461, 462, 463, 464, 465, 466—one downstream from each of the sixteen paths of the fourth stage.

Moreover the mixer 400 includes a recombination system located downstream from the flow restrictor system 450 that includes recombination points 467, 468, 469, 490, 470, 471, 472, 473, 474, 475, 476, 477, 478, 479, 480. Like the mixers 100, 200, 300, the mixer 400 includes an equivalent split and recombination structure having an equivalent number of split points and recombination points. Finally, the mixer 400 recombines to a single outlet 404.

The mixer 400 displays that any number of stages are contemplated. Moreover, the mixer 400 further displays that the predetermined volume offset at each stage may be readily configurable to address any particular application.

Methods of mixing fluid in a chromatography system are also contemplated. In particular, methods may include providing a fluid, by at least one fluidic pump, to a mixer, such as one of the mixers 100, 200, 300, 400. The method may include receiving the fluid by an inlet of the mixer and splitting the flow of fluid at a first split into at least a first path and a second path of the mixer. Methods may include splitting the flow of fluid in the first path into a third path and a fourth path and splitting the flow of fluid in the second path into a fifth path and a sixth path. Methods may include offsetting the volume in the first path and the second path by a first predetermined volume, offsetting the volume in the third path and the fourth path by a second predetermined volume, and offsetting the volume in the fifth path and the sixth path by the second predetermined volume. Additionally, methods may include targeting the same frequency of compositional disturbances in the flow of fluid with the first predetermined volume and the second predetermined volume. Methods may additionally or alternatively include targeting a different frequency of compositional disturbances in the flow of fluid with the first predetermined volume and the second predetermined volume.

While the invention has been shown and described with reference to specific embodiments, it should be understood by those skilled in the art that various changes in form and detail may be made therein without departing from the spirit and scope of the invention as recited in the accompanying claims. For example, in some embodiments, the removable seal device may not include a support sleeve, or may include a support sleeve that is not made of a metallic material. Other variations are contemplated without departing from the scope of inventions described herein.

What is claimed is:

1. A mixer for use in a chromatography system comprising:
    an inlet configured to receive a flow of fluid;
    an outlet configured to provide the flow of fluid downstream from the mixer after the flow of fluid is mixed in the mixer;
    a first split connected to the inlet, the first split branching the flow of fluid from the inlet into a first path and a second path;
    a second split connected to an outlet of the first path, the second split branching the first path into a third path and a fourth path; and a third split connected to an outlet of the second path, the third split branching the second path into a fifth path and a sixth path, wherein the first path and the second path are offset by a first predetermined volume, wherein the third path and the fourth path are offset by a second predetermined volume, and wherein the fifth path and the sixth path are also offset by the second predetermined volume, and wherein the first predetermined volume and the second predetermined volume are each configured to target the same frequency of compositional disturbances in the flow of fluid.

2. The mixer of claim 1, wherein the first predetermined volume is two times the second predetermined volume.

3. The mixer of claim 1, further comprising a flow restrictor system located downstream from the third, fourth, fifth and sixth paths, and wherein the flow restrictor system is balanced to provide an equal volume flow rate through each of the third, fourth, fifth and sixth paths.

4. The mixer of claim 3, wherein the flow restrictor system includes a plurality of coiled restrictors.

5. The mixer of claim 1, further comprising a split system that includes the first split, the second split and the third split, and further comprising a recombination system downstream from the split system, wherein the recombination system includes an equal number of recombination points as splits in the split system.

6. The mixer of claim 1, wherein the mixer is incorporated into a liquid chromatography system that includes:
at least one solvent reservoir;
a pump connected to the at least one solvent reservoir configured to pump a flow of fluid from the at least one solvent reservoir downstream;
the mixer located downstream from the pump;
a sample injector downstream from the mixer configured to inject a sample into the flow of fluid;
a chromatography column downstream from the sample injector configured to perform separation of the sample; and
a detector downstream from the chromatography column.

7. A method of mixing fluid in a fluid chromatography system comprising:
providing a fluid, by at least one fluidic pump, to a mixer;
receiving the fluid by an inlet of the mixer;
splitting the flow of fluid at a first split into at least a first path and a second path;
splitting the flow of fluid in the first path into a third path and a fourth path;
splitting the flow of fluid in the second path into a fifth path and a sixth path;
offsetting the volume in the first path and the second path by a first predetermined volume;
offsetting the volume in the third path and the fourth path by a second predetermined volume;
offsetting the volume in the fifth path and the sixth path by the second predetermined volume; and
targeting the same frequency of compositional disturbances in the flow of fluid with the first predetermined volume and the second predetermined volume.

8. A mixer for use in a chromatography system comprising:
an inlet configured to receive a flow of fluid;
an outlet configured to provide the flow of fluid downstream from the mixer after the flow of fluid is mixed in the mixer;

a first split connected to the inlet, the first split branching the flow of fluid from the inlet into a first path and a second path;

a second split connected to an outlet of the first path, the second split branching the first path into a third path and a fourth path; and a third split connected to an outlet of the second path, the third split branching the second path into a fifth path and a sixth path, wherein the first path and the second path are offset by a first predetermined volume, wherein the third path and the fourth path are offset by a second predetermined volume, and wherein the fifth path and the sixth path are also offset by the second predetermined volume, and wherein the first predetermined volume and the second predetermined volume are each configured to target a different frequency of compositional disturbances in the flow of fluid.

9. The mixer of claim 8, wherein the first predetermined volume is two times the second predetermined volume.

10. The mixer of claim 8, further comprising an amplitude controlling feature configured to reduce the amplitude of compositional disturbances.

11. The mixer of claim 8, further comprising a flow restrictor system located downstream from the third, fourth, fifth and sixth paths, and wherein the flow restrictor system is balanced to provide an equal volume flow rate through each of the third, fourth, fifth and sixth paths.

12. The mixer of claim 11, wherein the flow restrictor system includes a plurality of coiled restrictors.

13. The mixer of claim 8, further comprising a split system that includes the first split, the second split and the third split, and further comprising a recombination system downstream from the split system, wherein the recombination system includes an equal number of recombination points as splits in the split system.

14. The mixer of claim 8, wherein the mixer is incorporated into a liquid chromatography system that includes:
at least one solvent reservoir;
a pump connected to the at least one solvent reservoir configured to pump a flow of fluid from the at least one solvent reservoir downstream;
the mixer located downstream from the pump;
a sample injector downstream from the mixer configured to inject a sample into the flow of fluid;
a chromatography column downstream from the sample injector configured to perform separation of the sample; and
a detector downstream from the chromatography column.

15. A method of mixing fluid in a fluid chromatography system comprising:
providing a fluid, by at least one fluidic pump, to a mixer;
receiving the fluid by an inlet of the mixer;
splitting the flow of fluid at a first split into at least a first path and a second path;
splitting the flow of fluid in the first path into a third path and a fourth path;
splitting the flow of fluid in the second path into a fifth path and a sixth path;
offsetting the volume in the first path and the second path by a first predetermined volume;
offsetting the volume in the third path and the fourth path by a second predetermined volume;
offsetting the volume in the fifth path and the sixth path by the second predetermined volume; and targeting a different frequency of compositional disturbances in the flow of fluid with the first predetermined volume and the second predetermined volume.

* * * * *